(12) United States Patent
Rappoport et al.

(10) Patent No.: US 9,651,319 B2
(45) Date of Patent: *May 16, 2017

(54) LAMINATED ROLL OF SEALED GRAPHITE POUCHES AND METHODS FOR MAKING THE SAME

(71) Applicant: Apple Inc., Cupertino, CA (US)

(72) Inventors: Benjamin Rappoport, Los Gatos, CA (US); Derek W. Wright, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 678 days.

This patent is subject to a terminal disclaimer.

(21) Appl. No.: 14/060,013

(22) Filed: Oct. 22, 2013

(65) Prior Publication Data

US 2014/0041845 A1 Feb. 13, 2014

Related U.S. Application Data

(63) Continuation of application No. 13/628,846, filed on Sep. 27, 2012, now Pat. No. 8,563,104.

(Continued)

(51) Int. Cl.
*F28F 21/02* (2006.01)
*B32B 3/26* (2006.01)
(Continued)

(52) U.S. Cl.
CPC ............. *F28F 21/02* (2013.01); *B32B 3/08* (2013.01); *B32B 3/26* (2013.01); *B32B 7/02* (2013.01); *B32B 7/08* (2013.01); *B32B 7/12* (2013.01); *B32B 27/08* (2013.01); *B32B 2307/416* (2013.01); *B32B 2457/00* (2013.01); *B32B 2457/20* (2013.01); *B65B 2220/22* (2013.01); *Y10T 156/1052* (2015.01); *Y10T 156/1084* (2015.01); *Y10T 156/1089* (2015.01); *Y10T 156/1097* (2015.01); *Y10T 428/1064* (2015.01);

(Continued)

(58) Field of Classification Search
CPC ................ F28F 21/02; Y10T 428/1334; Y10T 156/1089; Y10T 428/30; Y10T 156/1084; Y10T 428/1064; Y10T 156/1097; Y10T 156/1052; Y10T 428/239; Y10T 428/13; Y10T 428/234; B32B 3/26; B32B 7/12; B32B 2220/22; B32B 7/02; B32B 7/08; B32B 27/08; B32B 3/08; B32B 2307/416; B32B 2457/00; B32B 2457/20
See application file for complete search history.

(56) References Cited

U.S. PATENT DOCUMENTS

4,640,838 A 2/1987 Isakson et al.

*Primary Examiner* — Michael C Miggins
(74) *Attorney, Agent, or Firm* — Michael H. Lyons (57) ABSTRACT

Laminated rolls of sealed graphite pouches and methods for making the same are provided. The laminated roll can include a first substrate having a length and a plurality of sealed pouches disposed on the substrate at predetermined intervals along its length. Each sealed pouch can include a graphite sheet having first and second sides, the first side affixed to the substrate, and a second substrate affixed to at least the second side of the graphite sheet and to a portion of the substrate to fully seal the graphite sheet within an enclosed space. In one embodiment, the roll of sealed graphite sheet pouches can be fixed to a roll of another substrate in a roll-to-roll fashion and the combined rolls can be cut into discrete portions for use in a particular application. For example, the roll of the other substrate can be a roll of enhanced spectral reflector (ESR).

19 Claims, 5 Drawing Sheets

Related U.S. Application Data

(60) Provisional application No. 61/619,251, filed on Apr. 2, 2012.

(51) Int. Cl.
*B32B 7/12* (2006.01)
*B32B 7/02* (2006.01)
*B32B 7/08* (2006.01)
*B32B 27/08* (2006.01)
*B32B 3/08* (2006.01)

(52) U.S. Cl.
CPC ........ *Y10T 428/13* (2015.01); *Y10T 428/1334* (2015.01); *Y10T 428/234* (2015.01); *Y10T 428/239* (2015.01); *Y10T 428/30* (2015.01)

LAMINATED ROLL OF SEALED GRAPHITE POUCHES AND METHODS FOR MAKING THE SAME

CROSS-REFERENCE TO RELATED APPLICATION

This application is a continuation patent application of U.S. patent application Ser. No. 13/628,846, filed Sep. 27, 2012 and titled "Laminated Roll of Sealed Graphite Pouches and Methods for Making the Same," now U.S. Pat. No. 8,563,104, which claims the benefit of U.S. Provisional Patent Application No. 61/619,251, filed Apr. 2, 2012 and titled "Laminated Roll of Sealed Graphite Pouches and Methods for Making the Same," the disclosures of which are hereby incorporated by reference herein in their entireties.

BACKGROUND

This is directed to laminated rolls of sealed graphite pouches and methods for making the same. In particular, this is directed to a roll of sealed graphite pouches that can be fixed to a substrate in a roll-to-roll fashion.

A portable electronic device can include several components coupled to a circuit board for providing processing and other device operations. Some of the components can generate heat that needs to be dissipated to ensure adequate device functioning. To protect the components from the heat, different heat dissipating approaches can be used. In one approach a metal-based heat spreader such as copper can be placed adjacent to a heat generating component. In another approach a composite-based heat spreader such as a graphite sheet can be used. Each approach has it advantages and disadvantages over the other and one particular approach may be more suitable for specific types of applications. For example, a composite-based heat spreader may be more suitable for use with a liquid crystal display (LCD) than a metal-based heat spreader.

The use of composite-based heat spreaders, though preferable for certain applications, requires the use of relatively expensive and time-consuming manufacturing processes to produce suitable composite-based heat spreaders. Accordingly, composite-based heat spreaders that are amenable to rapid and cost efficient manufacturing processes are needed.

SUMMARY OF THE INVENTION

Laminated rolls of sealed graphite pouches and methods for making the same are provided. The laminated roll can include a first substrate having a length and a plurality of sealed pouches disposed on the substrate at predetermined intervals along its length. Each sealed pouch can include a graphite sheet having first and second sides, the first side affixed to the substrate, and a second substrate affixed to at least the second side of the graphite sheet and to a portion of the substrate to fully seal the graphite sheet within an enclosed space. The sealed pouch prevents any particulate matter associated with the graphite sheet from escaping. In one embodiment, the roll of sealed graphite sheet pouches can be fixed to a roll of another substrate in a roll-to-roll fashion and the combined rolls can be cut into discrete portions for use in a particular application. For example, the roll of the other substrate can be a roll of enhanced spectral reflector (ESR). By combining the roll of sealed graphite sheet pouches with the roll of ESR, the combined laminated roll can be rapidly and accurately cut into discrete portions that can be used in a particular application (e.g., a LCD module). Various different embodiments of sealed graphite sheet pouch rolls are discussed in more detail below.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

An electronic device can include components for which dissipation of heat is required. To provide appropriate heat protection for one or more components of the electronic device, one or more heat spreaders can be fixed to those one or more components. For example, one such component that generates heat and typically requires heat dissipation can be a liquid crystal display (LCD). LCDs typically include, among other parts, a light source, light guide, reflective film, polarizers, diffusers, and glass. The heat spreader is typically fixed to the reflective film, which forms the back portion of the LCD—the glass and/or polarizers and diffusers form the front portion. The reflective film, sometimes referred to as an enhanced spectral reflector (ESR), is responsible for reflecting light from the light source through the various components of the LCD. To ensure visual acuity of the LCD is maximized, it is desirable for the reflective film to be undisturbed by any heat spreader fixed thereto. If the reflective film is disturbed (e.g., dented, or somehow altered such that the even plane of the film is not completely uniform), its ability to accurately reflect light may be compromised.

One suitable heat spreader that can be fixed to the reflective film can be a metal-based heat spreader such as a copper heat spreader. Copper is a ductile material susceptible to retaining any dents it receives. Such dents could be caused if the electronic device is dropped and an adjacent component presses into the copper. The resulting dent would then impress itself into the reflective film, and thereby affect the film's reflective performance.

Another suitable heat spreader that can be fixed to the reflective film can be a composite-based heat spreader such as a graphite sheet. Graphite is much less malleable than copper and is more resistant to retaining dents and the like if subjected to impact events. As such, graphite sheets are better candidates for application to impact sensitive materials such as reflective films. However, one issue with graphite is that it has a tendency to shed graphite particles. These particles can adversely affect the operation of one or more components (e.g., LCD) or exit the electronic device, causing a user to think the device is dirty.

Figure 1A:
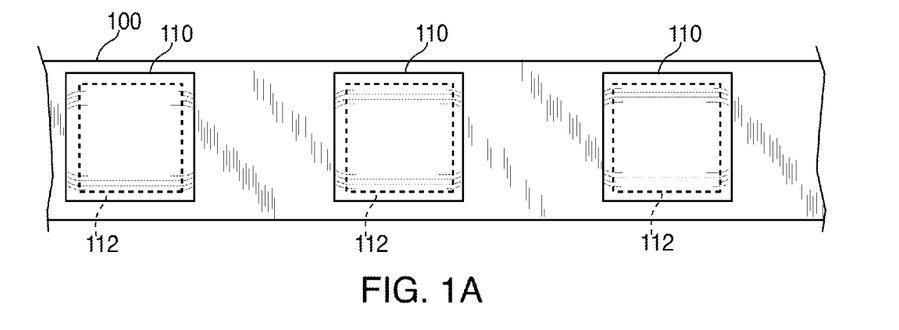
FIGS. 1A and 1B show illustrative top and cross-sectional views, respectively, of a roll according to an embodiment of the invention.
Figure 1B:
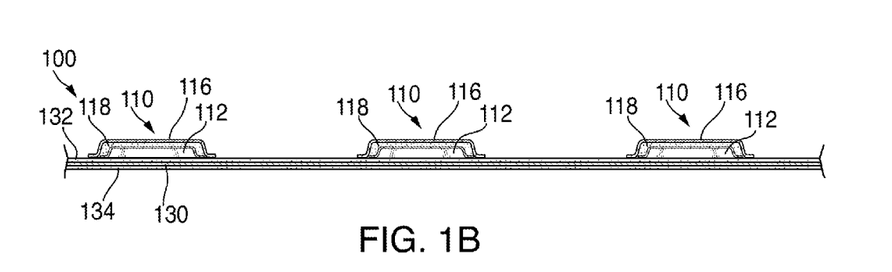

Embodiments of this invention refer to a roll of graphite sheets, with each graphite sheet fully sealed within a pouch, that can be fixed to another substrate such as a roll of reflective film. Referring now to FIGS. 1A and 1B, top and cross-sectional views, respectively, of roll 100 containing sealed graphite sheet pouches 110 are shown. Roll 100 can have a predetermined length suitable for containing any suitable number of sealed graphite sheet pouches 110. Only three sealed graphite sheet pouches 110 are shown, but it is understood that any suitable number of pouches 110 may be contained on a roll. Pouches 110 may be spaced a predetermined distance apart from each other to promote roll-to-roll combination with another substrate. In addition, roll 100 can include one or more registered tracks (not shown) that can assist in roll-to-roll combination.

Each pouch 110 includes graphite sheet 112, which is shown as dashed lines in FIG. 1A. Each graphite sheet is illustrated to occupy a vast majority of the pouch, but this is merely illustrative. As will be discussed in more detail below, the shape of the graphite sheet may vary and the pouch may contain other materials other than just the graphite sheet.

FIG. 1B shows an enlarged illustrative cross-sectional view of roll 100. Note the relative thicknesses of each layer are illustrative and are not dispositive as to actual relative thickness. As shown, graphite sheet 112 sits on top of adhesive layer 132, which is part of carrier substrate 130. Carrier substrate 130 can also have an adhesive layer 134. It is adhesive layer 134 that may be affixed to another substrate such as a reflective layer or directly to another component. Carrier substrate 130 can be any suitable material such as, for example, a plastic.

Pouch 110 is formed by substrate 116, which is affixed to at least the top portion of graphite sheet 112 and adhesive 132 via adhesive 118. Substrate 116 can be any suitable material such as, for example, a plastic or polyethylene terephthalate (PET). Substrate 116 completely covers and extends beyond the edges of graphite sheet 112 to completely seal sheet 112 within an enclosed space that will not allow any particulate matter derived from sheet 112 to escape. In some embodiments, substrate 116 may be fixed over sheet 116 such that an airgap exists around the periphery of sheet 116 and between adhesive 118.

Figure 2:
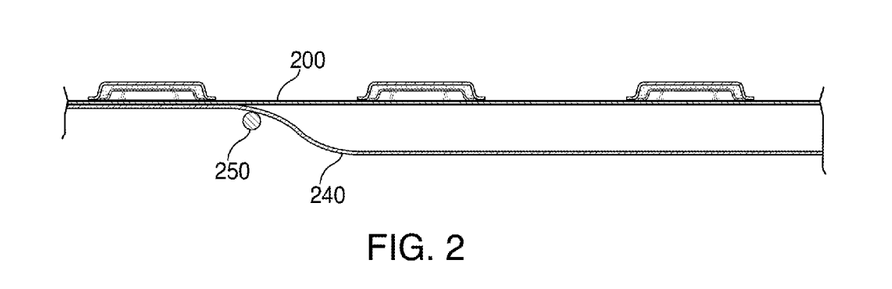
FIG. 2 shows an illustrative view of a roll-to-roll process in which a roll of sealed graphite sheet pouches is combined with a roll of another substrate in accordance with an embodiment of the invention.

FIG. 2 shows an illustrative view of a roll-to-roll process in which a roll 200 of sealed graphite sheet pouches is combined with a roll 240 of another substrate in accordance with an embodiment of the invention. Roll 200 can be similar to roll 100 of FIG. 1 in that it contains several sealed graphite sheets on a registered roll of a predetermined length. Roll 240 can be any suitable substrate that can be attached to roll 200. In one embodiment, roll 240 can be a roll of reflective layer such as ESR. In the roll-to-roll process, rolls 200 and 240 are combined at junction 250. For example, roll 200 can have an adhesive (e.g., adhesive 134 as shown in FIG. 1) that enables rolls 200 and 240 to be combined. The combination of rolls 200 and 240 can then be subject to further processing. For example, the combined rolls can be die cut at precise locations to cut out discrete portions that can be used for a particular application. An advantage of using the roll-to-roll combination process is that the cut can be precisely placed to yield a discrete portion having a graphite sheet substantially at the edge of the discrete portion. This way, when the discrete portion is applied to, for example, a component, the graphite sheet is located as near to the edge of the component as practically possible. Moreover, it is understood that the cut is made so as not to pierce the sealed pouch.

Figure 3A:
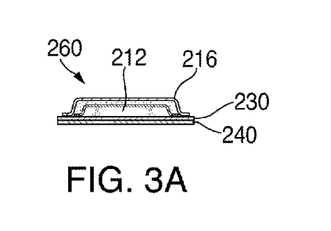
FIGS. 3A and 3B show illustrative cross-sectional and top views of a discrete portion of the combined rolls of FIG. 2 according to an embodiment of the invention.
Figure 3B:
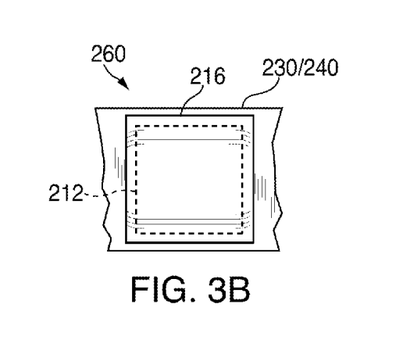
Figure 4A:
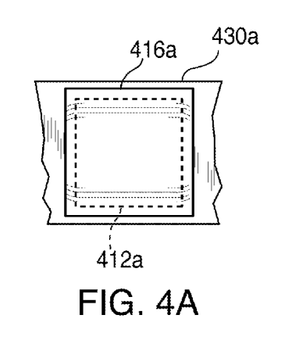
FIGS. 4A-4F show several different graphite sheet embodiments that may be contained within a sealed pouch on a roll of sealed graphite pouches in accordance with embodiments of the invention.
Figure 4B:
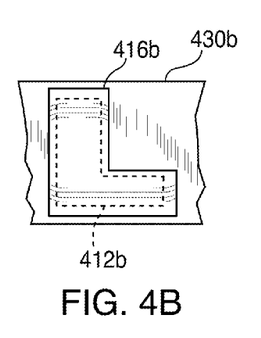
Figure 4C:
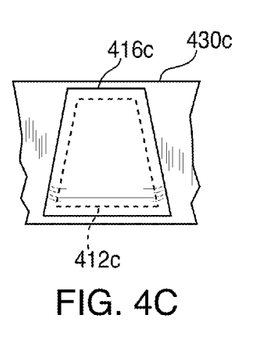
Figure 4D:
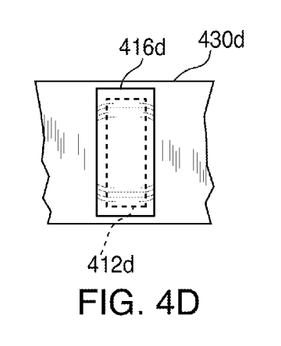
Figure 4E:
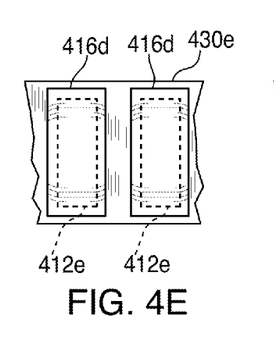
Figure 4F:
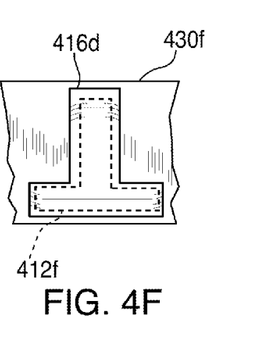

FIGS. 3A and 3B show illustrative cross-sectional and top views of discrete portion 260 of combined rolls 200 and 240. In particular, FIG. 3A shows graphite sheet 212 sitting on top of substrate 230 and enclosed within substrate 216. In addition, substrate 230 is shown fixed to substrate 240 (e.g., ESR). In embodiments in which substrate 240 is ESR, discrete portion 260 can be used as part of a LCD (not shown).

FIGS. 4A-4F show several different graphite sheet embodiments that may be contained within a sealed pouch on a roll of sealed graphite pouches in accordance with embodiments of the invention. Each figure includes graphite sheet 412a-f, pouch substrate 416a-f, and carrier substrate 430a-f. The graphite sheets in each FIG. vary in shape, and the corresponding pouch sheets can mimic the shape of the graphite sheet it covers. The different graphite sheets may be used to satisfy different heat spreading criteria based on its intended application. Although FIGS. 4A-4F only show six different possible variations, any suitable graphite sheet shape or combination of one or more graphite sheets may be included on a roll of sealed graphite sheets.

Figure 5A:
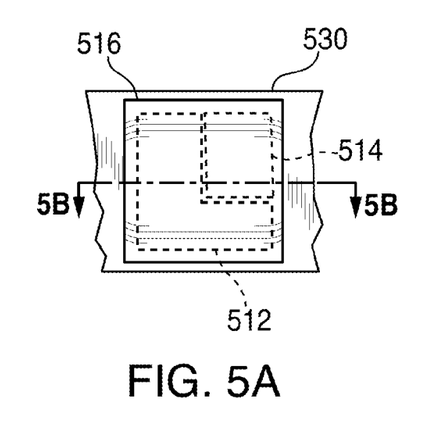
FIGS. 5A and 5B show illustrative views of a sealed pouch including a graphite sheet and spacer in accordance with an embodiment of the invention.
Figure 5B:
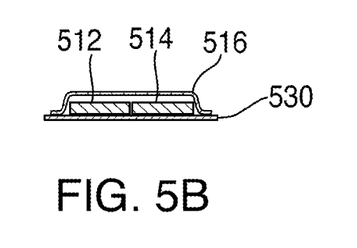

FIGS. 5A and 5B show illustrative views of a sealed pouch including a graphite sheet and spacer in accordance with an embodiment of the invention. In particular, FIG. 5A shows an illustrative top view of L-shaped graphite sheet 512, rectangular shaped spacer 514 positioned adjacent to the sheet 512, both of which are covered by pouch substrate 516. FIG. 5B shows an illustrative cross-sectional view. Sheet 512, spacer 514, and pouch substrate 516 sit on top of carrier substrate 530. The irregular shape of graphite sheet 512 coupled with use of pouch substrate 516 that does not substantially mimic its shape may benefit from the use of spacer 514 to ensure that any pressure applied to carrier substrate 530 is evenly distributed. Such even distribution may be needed, for example, if the sealed pouch of FIGS. 5A and 5B are applied to ESR.

Figure 6:
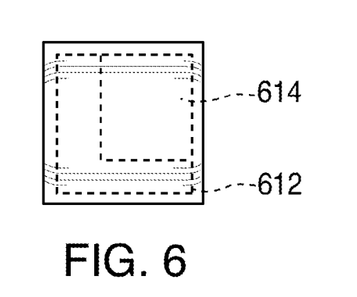
FIG. 6 shows a substantially flush interference fits between a graphite sheet and a spacer according to an embodiment of the invention.

It is desirable to minimize the gap between sheet 512 and spacer 516. Straight edge interference fits such as those shown in FIG. 5A can be relatively flush, but is subject to tolerance slop. FIG. 6 shows an alternative approach for substantially flush interference fits between graphite sheet 612 and spacer 614. As shown, the interference edges are cut to nestle into each other.

Figure 7:
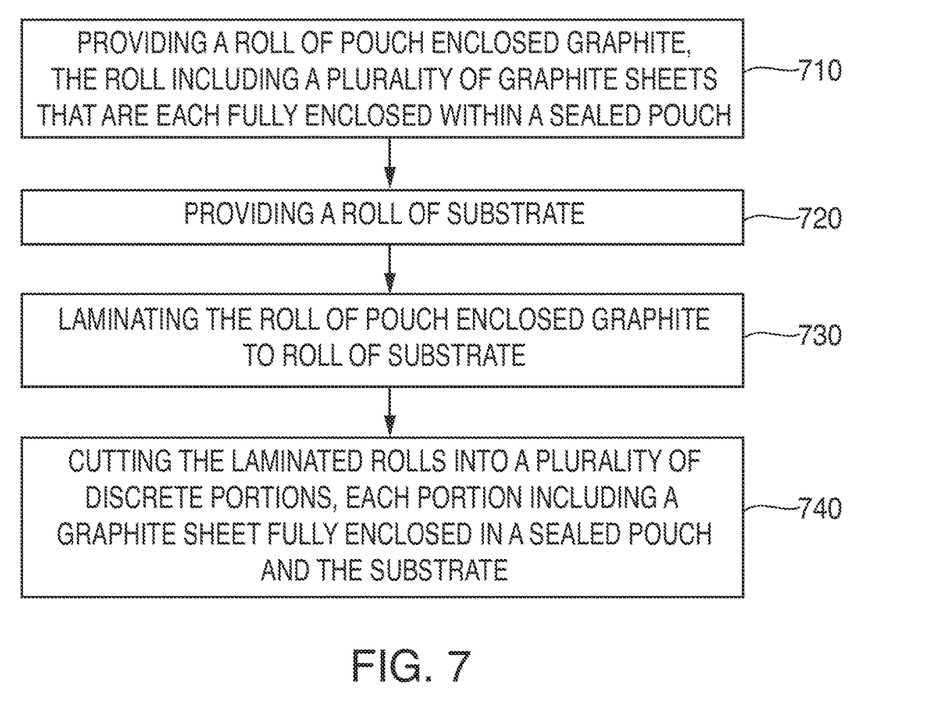
FIG. 7 is a flowchart of an illustrative process for providing a laminate roll in accordance with one embodiment of the invention.

FIG. 7 is a flowchart of an illustrative process for providing a laminate roll in accordance with one embodiment of the invention. Beginning at step 910, a roll is graphite enclosed in a sealed pouch is provided. For example, roll 100 of FIG. 1 may be provided. Then, at step 720, a roll of substrate is provided. The roll of substrate may be any suitable substrate such as ESR. At step 730, the roll of sealed graphite is laminated to the to roll of substrate. This is illustrated, for example, in FIG. 2. At step 740, the laminated rolls are cut into a plurality of discrete portions, each portion including a graphite sheet fully enclosed in a sealed pouch and the substrate.

Figure 8:
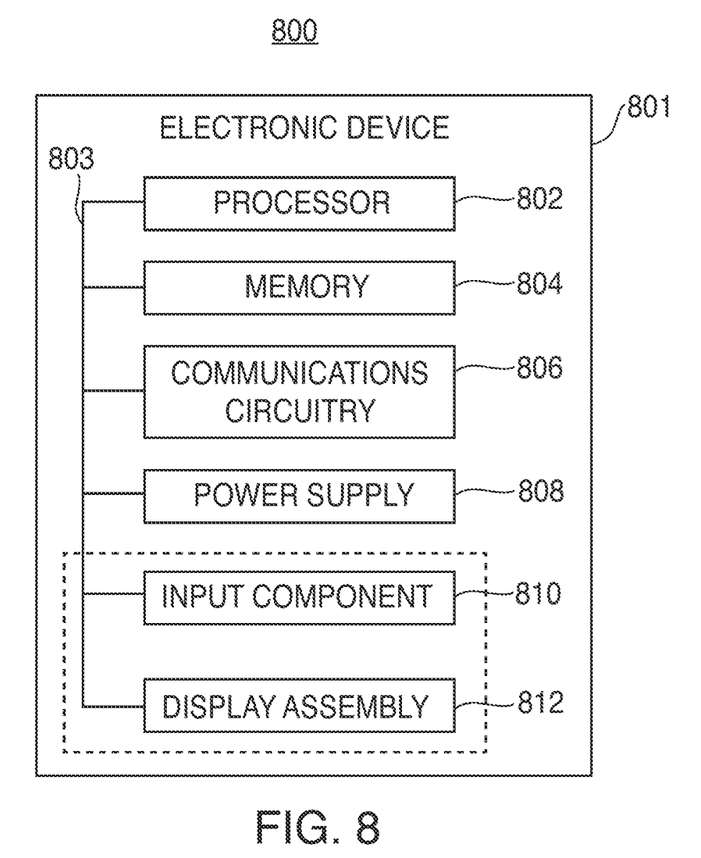
FIG. 8 is a schematic view of an illustrative electronic device for displaying visible information to a user in accordance with one embodiment of the invention.

FIG. 8 is a schematic view of an illustrative electronic device 801 for displaying visible information to a user. Electronic device 800 may be any portable, mobile, or hand-held electronic device configured to present visible information on a display assembly wherever the user travels. Alternatively, electronic device 800 may not be portable at all, but may instead be generally stationary. Electronic device 800 can include, but is not limited to, a music player, video player, still image player, game player, other media player, music recorder, movie or video camera or recorder, still camera, other media recorder, radio, medical equipment, domestic appliance, transportation vehicle instrument, musical instrument, calculator, cellular telephone, other wireless communication device, personal digital assistant, remote control, pager, computer (e.g., desktop, laptop, tablet, server, etc.), monitor, television, stereo equipment, set up box, set-top box, boom box, modem, router, keyboard, mouse, speaker, printer, and combinations thereof. In some embodiments, electronic device 800 may perform a single function (e.g., a device dedicated to displaying image content) and, in other embodiments, electronic device 800 may perform multiple functions (e.g., a device that displays image content, plays music, and receives and transmits telephone calls).

Electronic device 800 may include a housing 801, a processor or control circuitry 802, memory 804, communications circuitry 806, power supply 808, input component 810, and display assembly 812. Electronic device 800 may also include a bus 803 that may provide a data transfer path for transferring data and/or power, to, from, or between various other components of device 800. In some embodiments, one or more components of electronic device 800 may be combined or omitted. Moreover, electronic device 800 may include other components not combined or included in FIG. 8. For the sake of simplicity, only one of each of the components is shown in FIG. 8.

Memory 804 may include one or more storage mediums, including for example, a hard-drive, flash memory, permanent memory such as read-only memory ("ROM"), semipermanent memory such as random access memory ("RAM"), any other suitable type of storage component, or any combination thereof. Memory 804 may include cache memory, which may be one or more different types of memory used for temporarily storing data for electronic device applications. Memory 804 may store media data (e.g., music, image, and video files), software (e.g., for implementing functions on device 800), firmware, preference information (e.g., media playback preferences), lifestyle information (e.g., food preferences), exercise information (e.g., information obtained by exercise monitoring equipment), transaction information (e.g., information such as credit card information), wireless connection information (e.g., information that may enable device 800 to establish a wireless connection), subscription information (e.g., information that keeps track of podcasts or television shows or other media a user subscribes to), contact information (e.g., telephone numbers and e-mail addresses), calendar information, any other suitable data, or any combination thereof.

Communications circuitry 806 may be provided to allow device 800 to communicate with one or more other electronic devices or servers using any suitable communications protocol. For example, communications circuitry 806 may support Wi-Fi™ (e.g., an 802.11 protocol), Ethernet, Bluetooth™, high frequency systems (e.g., 900 MHz, 2.4 GHz, and 5.6 GHz communication systems), infrared, transmission control protocol/internet protocol ("TCP/IP") (e.g., any of the protocols used in each of the TCP/IP layers), hypertext transfer protocol ("HTTP"), BitTorrent™, file transfer protocol ("FTP"), real-time transport protocol ("RTP"), real-time streaming protocol ("RTSP"), secure shell protocol ("SSH"), any other communications protocol, or any combination thereof. Communications circuitry 806 may also include circuitry that can enable device 800 to be electrically coupled to another device (e.g., a computer or an accessory device) and communicate with that other device, either wirelessly or via a wired connection.

Power supply 808 may provide power to one or more of the components of device 800. In some embodiments, power supply 808 can be coupled to a power grid (e.g., when device 800 is not a portable device, such as a desktop computer). In some embodiments, power supply 808 can include one or more batteries for providing power (e.g., when device 800 is a portable device, such as a cellular telephone). As another example, power supply 808 can be configured to generate power from a natural source (e.g., solar power using one or more solar cells).

One or more input components 810 may be provided to permit a user to interact or interface with device 800. For example, input component 810 can take a variety of forms, including, but not limited to, a track pad, dial, click wheel, scroll wheel, touch screen, one or more buttons (e.g., a keyboard), mouse, joy stick, track ball, and combinations thereof. For example, input component 810 may include a multi-touch screen. Each input component 810 can be configured to provide one or more dedicated control functions for making selections or issuing commands associated with operating device 800.

Electronic device 800 may also include one or more output components that may present information (e.g., textual, graphical, audible, and/or tactile information) to a user of device 800. An output component of electronic device 400 may take various forms, including, but not limited to, audio speakers, headphones, audio line-outs, visual displays, antennas, infrared ports, rumblers, vibrators, or combinations thereof.

For example, electronic device 800 may include display assembly 812 as an output component. Display 812 may include any suitable type of display or interface for presenting visible information to a user of device 800. In some embodiments, display 812 may include a display embedded in device 800 or coupled to device 800 (e.g., a removable display). Display 812 may include, for example, a liquid crystal display ("LCD"), a light emitting diode ("LED") display, an organic light-emitting diode ("OLED") display, a surface-conduction electron-emitter display ("SED"), a carbon nanotube display, a nanocrystal display, any other suitable type of display, or combination thereof. Alternatively, display 812 can include a movable display or a projecting system for providing a display of content on a surface remote from electronic device 800, such as, for example, a video projector, a head-up display, or a three-dimensional (e.g., holographic) display. As another example, display 812 may include a digital or mechanical viewfinder. In some embodiments, display 812 may include a viewfinder of the type found in compact digital cameras, reflex cameras, or any other suitable still or video camera.

It should be noted that one or more input components and one or more output components may sometimes be referred to collectively as an I/O interface (e.g., input component 810 and display 812 as I/O interface 811). It should also be noted that input component 810 and display 812 may sometimes be a single I/O component, such as a touch screen that may receive input information through a user's touch of a display screen and that may also provide visual information to a user via that same display screen. In one embodiment, the discrete portion of the sealed graphite sheet pouch can be fixed to display 812. In another embodiment, the discrete portion of the sealed graphite sheet pouch can be fixed to one or more of components 802, 804, 806, 808, 810, and 812.

Processor 802 of device 800 may control the operation of many functions and other circuitry provided by device 800. For example, processor 802 may receive input signals from input component 810 and/or drive output signals to display assembly 812. Processor 802 may load a user interface program (e.g., a program stored in memory 804 or another device or server) to determine how instructions or data received via an input component 810 may manipulate the way in which information is provided to the user via an output component (e.g., display 812). For example, processor 802 may control the viewing angle of the visible information presented to the user by display 812 or may otherwise instruct display 812 to alter the viewing angle.

Electronic device 800 may also be provided with a housing 801 that may at least partially enclose one or more of the components of device 800 for protecting them from debris and other degrading forces external to device 400. In some embodiments, one or more of the components may be provided within its own housing (e.g., input component 810 may be an independent keyboard or mouse within its own housing that may wirelessly or through a wire communicate with processor 802, which may be provided within its own housing).

The previously described embodiments are presented for purposes of illustration and not of limitation. It is understood that one or more features of an embodiment can be combined with one or more features of another embodiment to provide systems and/or methods without deviating from the spirit and scope of the invention. The present invention is limited only by the claims which follow.

What is claimed is:

1. A heat spreading device comprising:
    a first substrate including a top portion;
    a graphite sheet affixed to said top portion;
    a second substrate affixed to said top portion to form an enclosed space between said first substrate and said second substrate;
    said graphite sheet contained within said enclosed space; and
    said second substrate spaced from said graphite sheet, wherein an airgap is formed between said graphite sheet and said second substrate.

2. The heat spreading device defined in claim 1 further comprising an adhesive layer affixing said graphite sheet and said top portion.

3. The heat spreading device defined in claim 1 wherein the first substrate, the graphite sheet, and the second substrate define a heat spreading pouch, the heat spreading device further comprising an additional heat spreading pouch.

4. The heat spreading device defined in claim 1 further comprising a reflective layer attached to a bottom portion of said first substrate.

5. The heat spreading device defined in claim 4 further comprising an adhesive layer affixing said reflective layer and said bottom portion.

6. The heat spreading device defined in claim 4 wherein the reflective layer comprises an enhanced spectral reflector.

7. The heat spreading device defined in claim 1 further comprising a spacer adjacent to said graphite sheet in said enclosed space.

8. The heat spreading device defined in claim 7 wherein the aforesaid airgap is between said spacer and said second substrate.

9. The heat spreading device defined in claim 7 wherein said spacer, said graphite sheet and the aforesaid airgap substantially occupy said enclosed space.

10. The heat spreading device defined in claim 7 wherein the graphite sheet directly contacts the spacer.

11. An enclosure for a graphite sheet comprising:
    a first substrate including a top portion;
    a second substrate affixed to said top portion to form a sealed enclosed space between said first substrate and said second substrate;
    a reflective layer affixed to said first substrate on a bottom portion of said first substrate;
    said graphite sheet affixed to said first substrate and contained within said seal enclosed space; and
    said graphite sheet spaced from said second substrate, wherein an airgap is formed between said graphite sheet and said second substrate.

12. The enclosure for a graphite sheet defined in claim 11 further comprising a liquid crystal display module.

13. The enclosure for a graphite sheet defined in claim 11 further comprising an adhesive layer affixing said graphite sheet and said top portion.

14. The enclosure defined in claim 11 wherein the second substrate is affixed to the top portion of the first substrate using an adhesive.

15. The enclosure defined in claim 11 wherein the first substrate and the second substrate comprise polyethylene terephthalate.

16. The enclosure for a graphite sheet defined in claim 11 further comprising a spacer adjacent to said graphite sheet in said enclosed space.

17. The enclosure for a graphite sheet defined in claim 16 wherein the aforesaid airgap is between said spacer and said second substrate.

18. The enclosure defined in claim 17 wherein the graphite sheet has an L-shape and the spacer has a rectangular shape, wherein the graphite sheet directly contacts two sides of the spacer.

19. The enclosure for a graphite sheet defined in claim 16 wherein said spacer and said graphite sheet substantially occupy said enclosed space.

* * * * *